United States Patent
Yamakage et al.

(10) Patent No.: US 7,508,744 B2
(45) Date of Patent: Mar. 24, 2009

(54) RECORDING AND REPRODUCING APPARATUS

(75) Inventors: Yuzuru Yamakage, Kawasaki (JP); Akiyoshi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 591 days.

(21) Appl. No.: 11/367,418

(22) Filed: Mar. 6, 2006

(65) Prior Publication Data

US 2007/0140090 A1 Jun. 21, 2007

(30) Foreign Application Priority Data

Nov. 2, 2005 (JP) ............................. 2005-319888

(51) Int. Cl.
*G11B 7/00* (2006.01)

(52) U.S. Cl. ...................... 369/103; 369/53.2

(58) Field of Classification Search ........................ None
See application file for complete search history.

(56) References Cited

U.S. PATENT DOCUMENTS

| 7,154,645 | B2 * | 12/2006 | Yasuda et al. ................ 359/11 |
| 2005/0063028 | A1 | 3/2005 | Yasuda et al. ................ 359/3 |
| 2005/0201247 | A1 * | 9/2005 | Goulanian et al. .......... 369/103 |
| 2005/0286388 | A1 * | 12/2005 | Ayres et al. ................ 369/103 |

FOREIGN PATENT DOCUMENTS

| EP | 1 507 177 A1 | 2/2005 |
| EP | 1 780 706 A2 | 5/2007 |
| JP | 2002-216359 | 8/2002 |

OTHER PUBLICATIONS

European Search Report dated Jun. 5, 2008.

* cited by examiner

*Primary Examiner*—Paul Huber
(74) *Attorney, Agent, or Firm*—Kratz, Quintos & Hanson, LLP

(57) ABSTRACT

A recording and reproducing apparatus has a recording control section for multiplex-recording data in one of recording unit regions of a holographic recording medium; a reproducing control section for selectively reproducing the data multiplex-recorded in the recording unit region; a measuring section for causing specific data to be recorded in a recording unit region A to measure a maximum multiplex-recordable number N of the region A; a multiplicity setting section for setting (i) a multiplex-recording number M (M<N) of data to be recorded in the region A and (ii) a multiplex-recording number (N−M) of a buffer region of the region A, by using the maximum multiplex-recordable number N; and a storage section for storing the number N and the number M. When data B is to be recorded in the region A beyond multiplex-recording number M, the recording control section multiplex-records page data B in the buffer region of the region A within the range of the maximum multiplex-recordable number N.

6 Claims, 16 Drawing Sheets

M=multiplex-recording number of page data

N=maximum multiplex-recordable number of recording region

M = multiplex-recording number of page data

N = maximum multiplex-recordable number of recording region

M=multiplex-recording number of page data
N=maximum multiplex-recordable number of recording region Fig. 5A
Fig. 5B
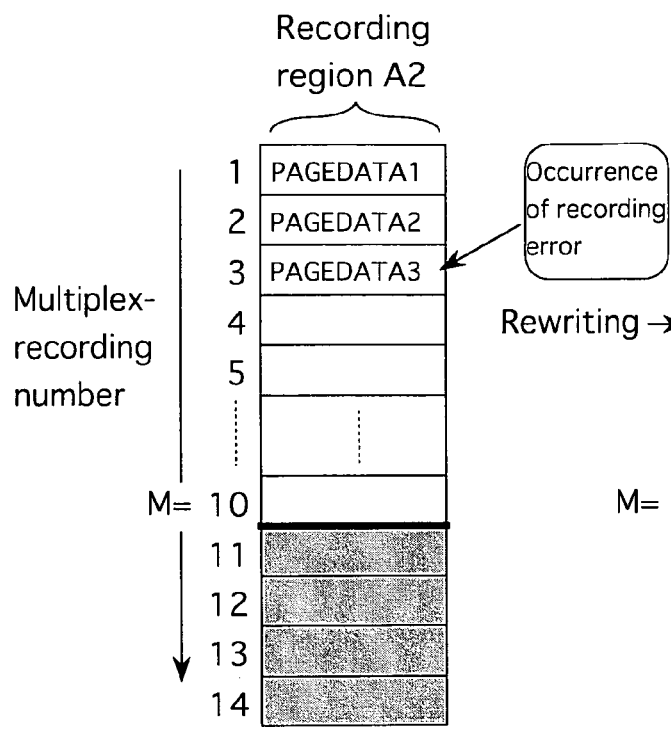
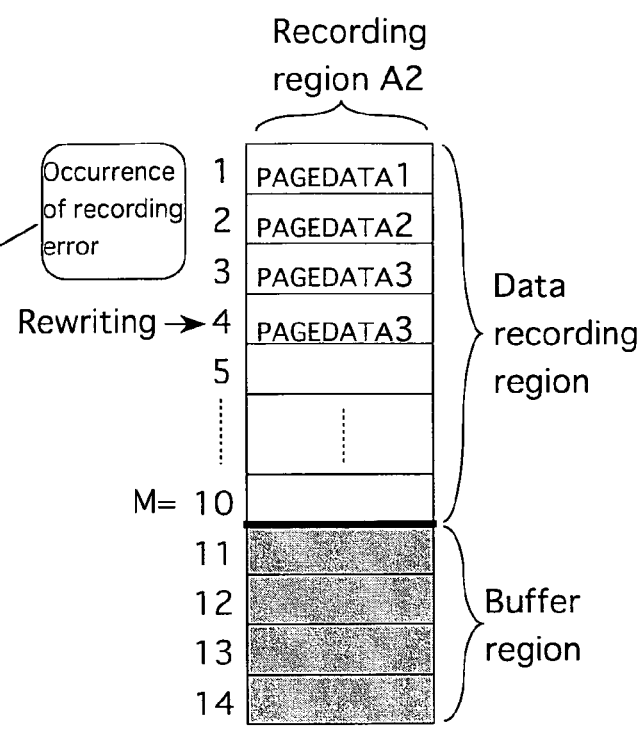

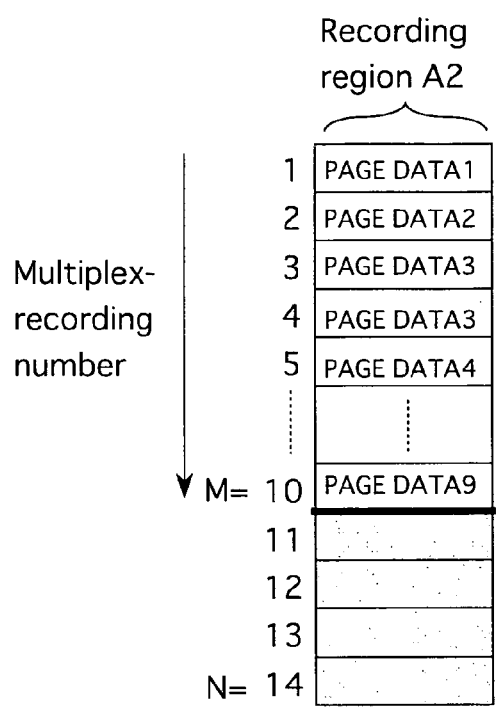
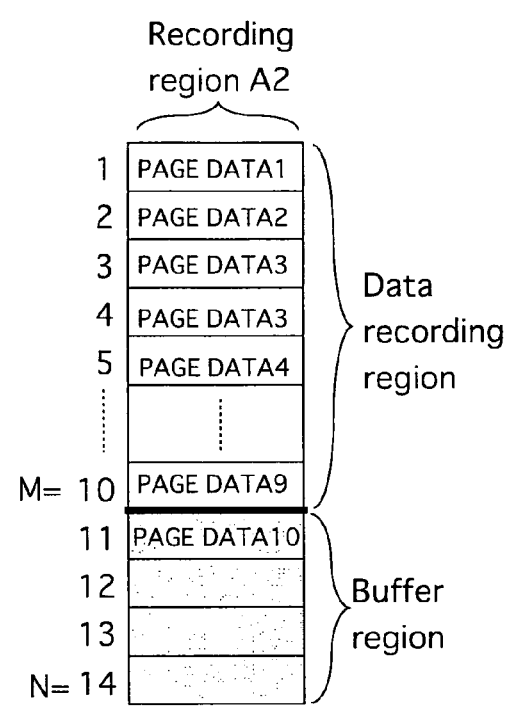
Fig. 6A
Fig. 6B

| Multiplex-recording number | | Recording region A2 | A3 |
|---|---|---|---|
| | 1 | PAGE DATA1 | |
| | 2 | PAGE DATA2 | |
| | 3 | PAGE DATA3 | |
| | 4 | PAGE DATA3 | |
| | 5 | PAGE DATA4 | |
| | ⋮ | ⋮ | |
| M= | 10 | PAGE DATA7 | |
| | 11 | PAGE DATA7 | |
| | 12 | PAGE DATA8 | |
| | 13 | PAGE DATA8 | |
| N= | 14 | PAGE DATA9 | |

| | | Recording region A2 | A3 |
|---|---|---|---|
| | 1 | PAGE DATA1 | |
| | 2 | PAGE DATA2 | |
| | 3 | PAGE DATA3 | |
| | 4 | PAGE DATA3 | |
| | 5 | PAGE DATA4 | |
| | ⋮ | ⋮ | |
| M= | 10 | PAGE DATA7 | |
| | 11 | PAGE DATA7 | PAGE DATA10 |
| | 12 | PAGE DATA8 | |
| | 13 | PAGE DATA8 | |
| N= | 14 | PAGE DATA9 | |

RECORDING AND REPRODUCING APPARATUS

CROSS-REFERENCE TO RELATED APPLICATIONS

This application is related to Japanese application No. 2005-319888 filed on Nov. 2, 2005, whose priority is claimed under 35 USC § 119, the disclosure of which is incorporated by reference in its entirety.

BACKGROUND OF THE INVENTION

1. Field of the Invention

The present invention relates to a recording and reproducing apparatus. More particularly, it relates to a recording and reproducing apparatus in which a holographic recording medium is irradiated with an information light beam and a reference light beam at the same time, and multiplex-recording of page data is performed in the same recording region in view of characteristics of the recording region.

2. Description of the Related Art

On a holographic recording medium, an information light beam corresponding to two-dimensional page data and a reference light beam are irradiated in the same region of the medium at the same time, thereby recording the two-dimensional page data in said region. Since the page data is recorded as interference fringes of the two light beams (information light beam and reference light beam), the plurality of page data can be multiplex-recorded in the same region of the medium.

In a method of multiplex-recording, an angular multiplex-recording method and a shift multiplex-recording method are suggested, for example. In an angular multiplex-recording method, an angle of the reference light beam applied to one recording region is varied. In a shift multiplex-recording method, multiplex-recordings are performed with a part of the region overlapped with each other while the recording region on the medium is slightly shifted, and the like.

In a conventional magnetic optical disc such as an MO or a DVD, the multiplex-recording in the same region could not be performed. But in the holographic recording method, multiplex-recording in the same region can be performed, and recording capacity can be considerably increased. For example, according to the angular multiplex-recording, in case that the recording region of the medium is divided into 50 (A1 to A50), an information light beam 10 and a reference light beam 11 are irradiated to each minimum recording unit region and multiplex-recordings of a plurality of page data are performed by changing an irradiation angle of the reference light beam as shown in FIG. 13.

FIG. 13 shows a case where the multiplex-recordings are performed by irradiating a recording unit region A2 with N reference light beams having different angles. In this case, N different page data can be multiplex-recorded in the same region A2 (refer to FIG. 14). The multiplicity (multiplex-recording number) in this case is N.

As one of documents disclosing a multiplex-recording method, there is known Japanese Unexamined Patent Publication No. 2002-216359.

However, it is difficult to manufacture the holographic recording medium so that all recording regions have completely uniform characteristics, since a recording material for recording data in the holographic recording medium is a photosensitive material. Thus, the local recording region of the medium has a large variation in recording characteristics in some cases.

For example, although 10 recorded page data can be normally reproduced in regions A1 and A2 in FIG. 13, when 10 recorded page data have been multiplex-recorded in lower right regions A48 and A49, it is often the case that a reproduction error occurs. In such case, only 7 page data can be multiplex-recorded at most in regions A48 and A49. Thus, there is a variation in recording characteristics.

As shown in FIG. 15, when the numbers of page data which can be multiplex-recorded differ in 6 recording unit regions within a range of M+1 to M+3, a value smaller than the number of page data which can be multiplex-recorded, that is, M is set to the maximum multiplex-recordable number of the medium, in view of reliability of recording and reproducing at the time of shipment.

It is considered that such variation in recording and reproducing characteristics is caused by a problem of a manufacturing process, a physical defect which could be generated in each layer which constitutes the medium, a variation in optical characteristics due to non-uniformity of a recording and reproducing apparatus or a medium material and the like.

However, even when the maximum multiplex-recording number M (maximum multiplicity) of the medium is ensured at the time of shipment, a recording unit region in which M (corresponding to the maximum multiplex-recording number M) page data cannot be multiplex-recorded could be generated due to a local variation in characteristics.

FIG. 16 shows a medium in which there is a larger variation in characteristics.

Referring to FIG. 16, the multiplex-recordable numbers in recording regions A1 to A6 are M, M+3, M−3, M+1, M and M−1, respectively.

In this case, although the M page was ensured as the maximum multiplex-recording number, multiplex-recordings of M−3 pages and multiplex-recordings of M−1 pages only can be performed in the recording regions A3 and A6 actually, respectively.

According to the recording unit region A3, although recordings can be normally performed until M−3 page data, when multiplex-recording is further performed, the page data (in M−2 and M−1) cannot be normally recorded and not only that, the first page data, for example could not be reproduced.

This is because multiplex-recording is performed by excessive exposure for the recording region having multiplex-recordable number actually smaller than the maximum recording number M beyond its recording performance, so that reproduction characteristics of the normally recorded page data could deteriorate. In other words, the page data cannot be recorded and already recorded page data could be destroyed.

Therefore, in order to ensure sufficient reliability of the recording and reproducing characteristics, lower maximum multiplicity L (<M) is set for all of the recording regions uniformly at the time of shipment as shown in FIG. 16. Alternatively, a strict test is performed before shipment and a medium having large variation in characteristics in which the maximum multiplicity M cannot be ensured may be determined as a defective medium so as not to be shipped. However, in this case, a yield of the medium is lowered and its manufacturing cost becomes high.

Meanwhile, when the lower maximum multiplicity L is guaranteed in order to ensure the sufficient reliability, there is a case in which a recording region having very preferable characteristic exists actually. For example, like the region A2 in FIG. 16, a recording region in which M+3 (greater than L) page data can be multiplex-recorded could exist. Although more page data can be recorded in the region A2, since the maximum multiplicity is set to L, the recordable space cannot be effectively used.

Referring to FIG. 16, since the maximum multiplicity is set to L, multiplex-recording is only performed L times for all regions, so that the recording space corresponding to a hatched part lower than the recording number L cannot be effectively used.

SUMMARY OF THE INVENTION

The present invention provides a recording and reproducing apparatus comprising: a recording control section for recording plural pages data by irradiating a holographic recording medium with a reference light beam and an information light beam, the medium including a plurality of recording unit regions and being capable of having plural pages data multiplex-recorded in each of the recording unit regions; a reproducing control section for selectively reproducing specific page data among the plural pages data multiplex-recorded in the recording unit region, by irradiating the medium with the reference light beam; a measuring section for causing the recording control section to record specific page data in a recording unit region A, which is one of the plurality of recording unit regions, to measure a maximum multiplex-recordable number N of the recording unit region A; a multiplicity setting section for setting (i) a multiplex-recording number M (M<N) of page data to be recorded in the recording unit region A and (ii) a multiplex-recording number (N−M) of a buffer region of the recording unit region A, by using the maximum multiplex-recordable number N; and a storage section for storing the maximum multiplex-recordable number N and the multiplex-recording number M, wherein when page data B is to be recorded in the recording unit region A beyond the multiplex-recording number M, the recording control section multiplex-records page data B in the buffer region of the recording unit region A within the range of the maximum multiplex-recordable number N.

With this configuration, since the maximum multiplex-recordable number N in the recording unit region is measured and the multiplex-recording number M of the page data in one recording unit region and the multiplex-recording number (N−M) of the buffer regions which can be used as substitution regions when recording defect of the page data and the like occurs are set, the recordable space can be effectively used in each recording unit region while reliability of recording and reproducing which has been originally designed for the holographic recording medium is ensured.

BRIEF DESCRIPTION OF THE DRAWINGS

FIGS. 5A and 5B are explanatory diagrams for rewriting in the multiplex-recording according to the present invention;

FIGS. 6A and 6B are explanatory diagrams for recording to a buffer region in the multiplex-recording according to the present invention;

FIGS. 7A and 7B are explanatory diagrams for recording to another recording region in the multiplex-recording according to the present invention;

DESCRIPTION OF THE PREFERRED EMBODIMENTS

Figure 1:
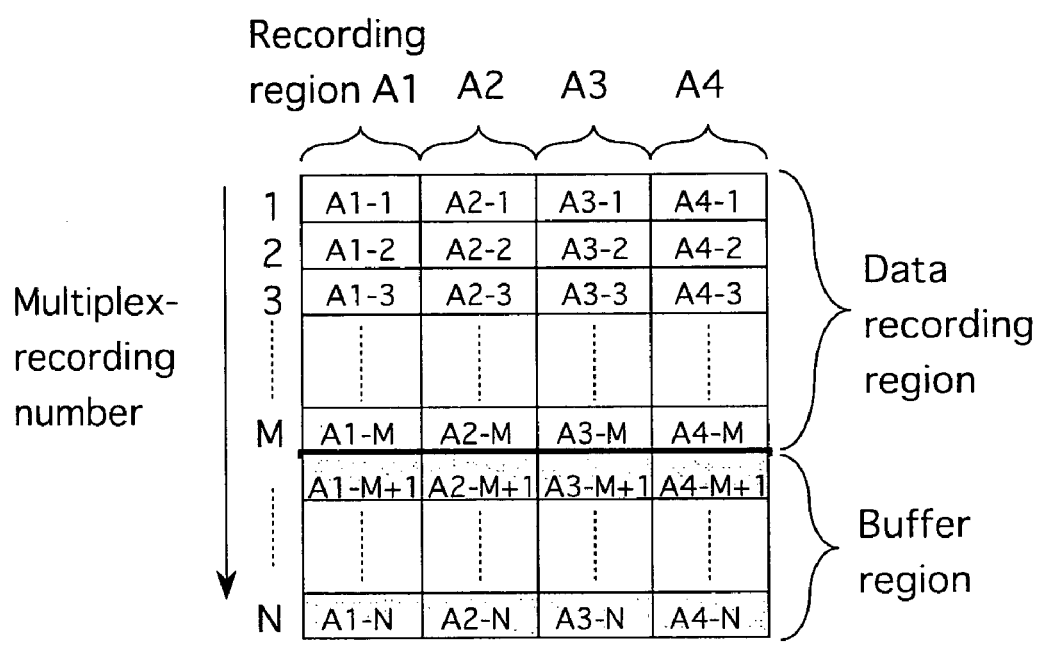
FIG. 1 is an explanatory diagram for multiplex-recording according to a first embodiment of the present invention.

The present invention is a recording and reproducing apparatus in which reliability of recording and reproducing characteristics is sufficiently ensured and a recording region can be effectively used and a recording space can be substantially increased in view of recordable space of each recording region of a holographic recording medium.

The present invention provides a recording and reproducing apparatus comprising: a recording control section for recording plural pages data by irradiating a holographic recording medium with a reference light beam and an information light beam, the medium including a plurality of recording unit regions and being capable of having plural pages data multiplex-recorded in each of the recording unit regions; a reproducing control section for selectively reproducing specific page data among the plural pages data multiplex-recorded in the recording unit region, by irradiating the medium with the reference light beam; a measuring section for causing the recording control section to record specific page data in a recording unit region A, which is one of the plurality of recording unit regions, to measure a maximum multiplex-recordable number N of the recording unit region A; a multiplicity setting section for setting (i) a multiplex-recording number M (M<N) of page data to be recorded in the recording unit region A and (ii) a multiplex-recording number (N−M) of a buffer region of the recording unit region A, by using the maximum multiplex-recordable number N; and a storage section for storing the maximum multiplex-recordable number N and the multiplex-recording number M, wherein when page data B is to be recorded in the recording unit region A beyond the multiplex-recording number M, the recording control section multiplex-records page data B in the buffer region of the recording unit region A within the range of the maximum multiplex-recordable number N.

Further, the measuring section selects P (P>1) recording unit regions among the plurality of recording unit regions based on a predetermined selection criterion, measures maximum multiplex-recordable numbers N of the selected P recording unit regions respectively, and sets an average value of the measured P maximum multiplex-recordable numbers to a maximum multiplex-recordable number N of the medium, and wherein the multiplicity setting section sets a multiplex-recording number M, which is to be applied to all of the recording unit regions of the medium uniformly, by using the set maximum multiplex-recordable number N.

Further, the measuring section divides the plurality of recording unit regions into R (R>1) groups, selects one recording unit region from each group according to a predetermined selection criterion, measures maximum multiplex-recordable numbers (N1, N2, ... NR) of, respectively, the selected R respective recording unit regions (A1, A2, ... AR), and sets the measured maximum multiplex-recordable numbers (N1, N2, ... NR) respectively to maximum multiplex-recordable numbers N of, respectively, the groups to which the recording unit regions (A1, A2, ... AR) belong, and wherein the multiplicity setting section sets the multiplex-recording number M of the page data, which is to be applied to all of the recording unit regions of the medium uniformly, to a value smaller than the smallest maximum multiplex-recordable number of all the measured R maximum multiplex-recordable numbers (N1, N2, ... NR), the multiplex-recording number of the buffer regions of one group differing from that of the buffer regions of another group.

Further, the measuring section divides the plurality of recording unit regions into R (R>1) groups, selects one recording unit region from each group according to a predetermined selection criterion, measures maximum multiplex-recordable numbers (N1, N2, ... NR) of, respectively, of the selected R recording unit regions (A1, A2, ... AR), and sets the measured maximum multiplex-recordable numbers (N1, N2, ... NR) respectively to maximum multiplex-recordable numbers N of, respectively, the groups to which the recording unit regions (A1, A2, ... AR) belong, and wherein the multiplicity setting section sets multiplex-recording numbers (M1, M2, ... MR) of page of data, which are to be respectively applied to all of the recording unit regions of each group, by respectively using the maximum multiplex-recordable numbers (N1, N2, ... NR) of, respectively, the groups, sets a difference between the maximum multiplex-recordable numbers (N1, N2, ... NR) and the multiplex-recording numbers (M1, M2, ... MR) respectively to the multiplex-recording numbers (N1−M1, N2−M2, ... NR−MR) of buffer regions of the recording unit regions in the groups, the multiplex-recording number of page data of one group differing from that of page data of another group, the multiplex-recording number of the buffer regions of one group differing from that of the buffer regions of another group.

In the present invention, when page data C to be recorded in the recording unit region A cannot be recorded, the recording control section may multiplex-record the page data C in the same recording unit region A again, and record different page data the number of pages of which is equal to the multiplex-recording number M of the recording unit region A in the recording unit region A in the recording unit region A, within the range of the maximum multiplex-recordable number N.

Further, when the recording control section records page data, the number of pages of which is equal to the maximum multiplex-recordable number N, in a recording unit region A1, which is one of the plurality of recording unit regions, and then the recording control section receives an instruction to record page data D in the region A1, the recording control section may multiplex-record the page data D in an unused buffer region of another recording unit region A2.

Embodiments of the present invention will be described with reference to the drawings hereinafter. In addition, the present invention is not limited to the following embodiments.

Constitution of Recording and Reproducing Apparatus of the Present Invention

Figure 12:
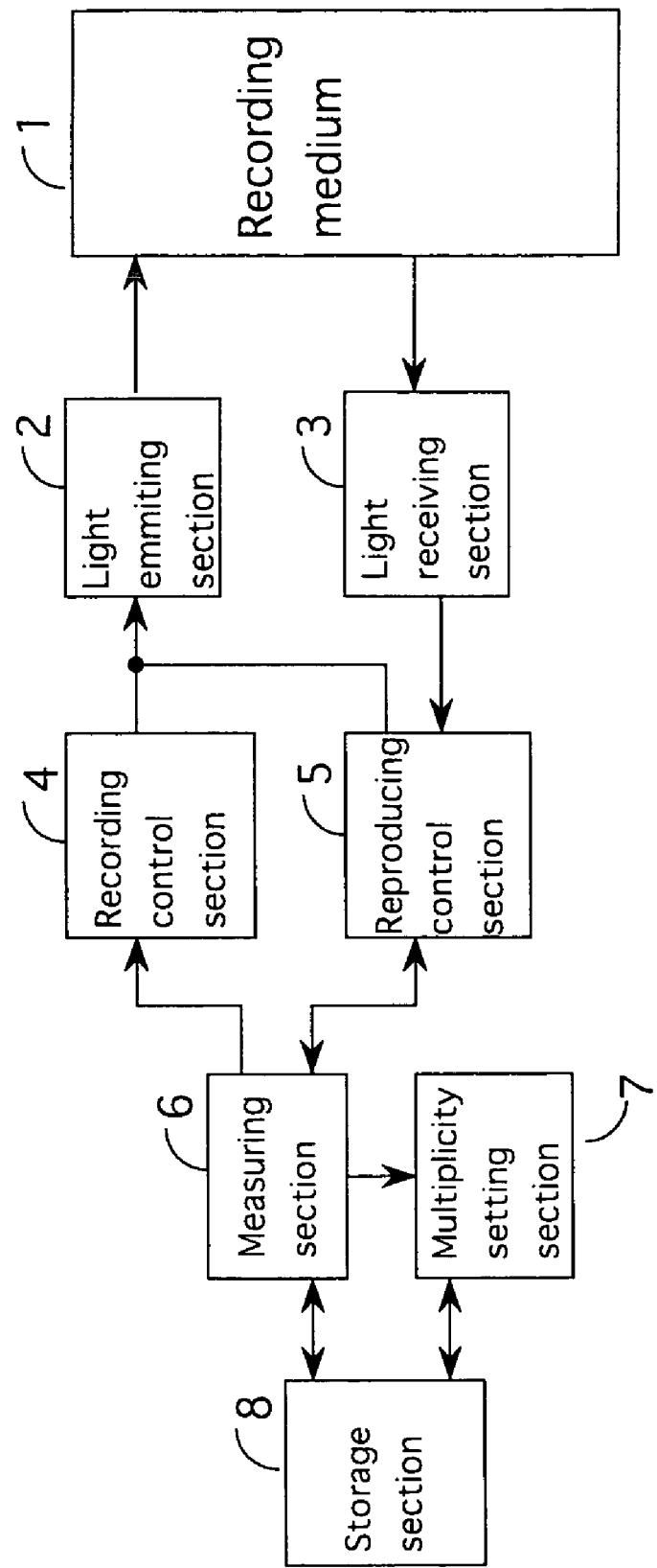
FIG. 12 is a block diagram showing a constitution of a recording and reproducing apparatus according to the present invention.

FIG. 12 is a block diagram showing a constitution of a recording and reproducing apparatus according to one embodiment of the present invention.

Referring to FIG. 12, the recording and reproducing apparatus according to the present invention can record and reproduce page data at a recording unit region on a holographic recording medium 1 and mainly comprises a light emitting section 2, a light receiving section 3, a recording control section 4, a reproducing control section 5, a measuring section 6, a multiplicity setting section 7, and a storage section 8. The holographic recording medium includes a plurality of recording unit regions and a plurality of page data can be multiplex-recorded in each region.

The light emitting section 2 irradiates the same recording unit region with an information light beam corresponding to user data whose recording is requested from an external high-order device such as a personal computer, and a reference light beam at the same time. The light emitting section 2 includes a light source, a beam splitter to split the light beam from the light source to the information light beam and the reference light beam, a mirror group, a lens group, a spatial light modulator (SLM), an actuator to adjust an incident angle of the reference light beam to the medium, and the like.

The light receiving section 3 receives a reproduction light beam generated when the reference light beam from the light emitting section 2 is reflected by the recording medium 1, and a CCD is employed, for example.

The recording control section 4 records page data on a holographic recording medium with the reference light beam and the information light beam, and controls each component such as the light emitting section so that the recording requested user data may be recorded on the recording medium 1. According to the present invention, predetermined measurement is taken by the measuring section 6 to perform a specific multiplex-recording.

In addition, according to the present invention, although one recording unit region of the medium 1 is one region physically, in view of multiplex-recording, it includes data recording regions in which the predetermined number of page data can be multiplex-recorded, and buffer regions which are used as preliminary regions when a recording error of the page data occurs. The number of page data which can be multiplex-recorded in one data recording region is predetermined and this number is referred to as the multiplex-recording number M of the page data hereinafter.

Meanwhile, although the certain number of page data can be recorded in the buffer regions, this number K of the page data can be uniquely found by the maximum multiplex-recordable number N measured for each recording unit region and the multiplex-recording number M of the page data. Here, the multiplex-recording number K of the buffer regions is determined such that K=N−M.

Since each recording unit region of the medium has the multiplex-recording number M of the data recording regions and the multiplex-recording number K of the buffer region, although the number corresponding to the maximum multiplex-recordable number N of the page data can be multiplex-recorded, as long as different page data are multiplex-recorded normally in a recording unit region A, the number of the page data which can be recorded in the region A is equal to the multiplex-recording number M (M<N) and the number M+1 or more of the page data are not recorded.

However, in case that a recording error and the like occurs, when page data B is further recorded in the recording unit region A beyond the multiplex-recording number M, the recording control section 4 multiplex-records the page data B in the buffer region of the region A within a range of the maximum multiplex-recordable number N.

Referring to FIG. 12, the reproducing control section 5 selectively reproduces specific page data to be reproduced among the plurality of page data multiplex-recorded in the recording unit region by irradiating the medium 1 with the reference light beam. When the page data is reproduced, information in the reproduction light beam received by the light receiving section 3 is decoded.

Although the recording control section 4 and the reproducing control section 5 can be constituted by hardware using a logic element, they can be implemented by cooperation of the hardware and software which can carry out a function of the hardware.

The software is stored in a ROM or a RAM, and a microcomputer including a CPU, the RAM, the ROM, an I/O controller, a timer and the like operates each hardware based on procedures of the software to implement the functions of both control sections.

The measuring section 6 measures the maximum multiplex-recordable number N in the recording unit region A when the recording control section 4 records specific page data in the predetermined recording unit region A.

The measuring section 6 can be implemented by a microcomputer mainly including a CPU and software in which its function is described.

The measuring section 6 takes measurement every recording unit region on the medium or in only a plurality of recording unit regions selected according to a predetermined selection criterion. In case of a write-once medium, it takes measurement in only the selected regions.

Here, the predetermined selection criterion means that when a recording surface on the medium is divided into some groups, one recording unit region belonging to the group is selected. Alternatively, the first recording unit region in the group may be selected.

In addition, the measuring section 6 measures input energy E2 of an irradiation light beam required for one multiplex-recording of the page data every selected recording unit region. Furthermore, it calculates allowable SNR (SNR_max) corresponding to the number of pages which can be multiplex-recorded actually, from the input energy E2 every recording unit region. When recording and reproducing characteristics are different in each recording unit region to be measured, since the input energy E2 required for one multiplex-recording is different, its allowable SNR is also different.

This allowable SNR is a numeric value corresponding to the number of page data which can be actually correctly multiplex-recorded (maximum multiplex-recordable number N) when the multiplex-recording is performed in the recording unit region, and it is determined by accumulated input energy applied in a state the multiplex-recording can be performed in the region normally. In addition, the allowable SNR means that when the accumulated input energy corresponding to the SNR which is greater than the allowable SNR is applied, the page data recorded in the region is destroyed.

In addition, the SNR (SNR_ave) provided when one page data is multiplex-recorded is constant on a specific kind of medium according to its designed specification in general. Therefore, the maximum multiplex-recordable number N can be calculated from the allowable SNR (SNR_max)/SNR_ave in one recording unit region, which will be described in detail below.

The multiplicity setting section 7 sets the multiplex-recording number M of the page data in the recording unit region A, and the multiplex-recording number of the buffer regions in the recording unit region A.

The multiplex-recording number M can be set from the maximum multiplex-recordable number N measured by the measuring section. For example, when a criterion such that "the multiplex-recording number M is set to a value which is smaller than the maximum multiplex-recordable number N by five" is stored as the setting criterion in the storage section 8, the multiplex-recording number M is set such that M=N−5.

That is, when the setting criterion is stored in the storage section 8, the multiplex-recording number M is set according to the setting criterion. When a plurality of criteria are set every divided group of the medium, the multiplex-recording number M is set based on the setting criterion for the group, using the maximum multiplex-recordable number N measured every group.

In addition, the setting criterion of the multiplex-recording number M is preferably determined from estimated defect frequency.

When the multiplex-recording number M of the page data in the recording unit region A is determined, the multiplex-recording number of the buffer regions in the region A is uniquely determined using the maximum multiplex-recordable number N in the region A such that N−M.

The storage section 8 stores data such as numeric values of various kinds of parameters used in the present invention, measured results, arithmetic expressions, setting conditions. The data which is not to be deleted is stored in a nonvolatile fixed recording element such as the ROM and a flash memory, and the data which is only to be temporally stored is stored in the RAM and the like.

For example, the storage section 8 stores the accumulated input energy, the allowable SNR (SNR_max), the SNR (SNR_ave) required for one multiplex-recording, the maximum multiplex-recordable number N, the multiplex-recording number M of the page data, the multiplex-recording number of the buffer regions, and the like.

In addition, the recording control section 4 performs the following recording operation other than the above recording operation.

For example, in case that the recording control section cannot record page data C to be recorded in the recording unit region A, it multiplex-records the page data C in the same recording unit region A again and records different page data the number of which corresponds to the multiplex-recording number M in the recording unit region A within a range of the maximum multiplex-recordable number N.

In addition, after the recording control section records the page data the number of which corresponds to the maximum multiplex-recordable number N in the recording unit region A1, when it receives an instruction to record page data D in the region A1, it multiplex-records the page data D in an unused buffer region of another recording unit region A2.

First Embodiment of Multiplex-Recording in the Present Invention

FIG. 1 is an explanatory diagram for angular multiplex-recording according to a first embodiment of the present invention.

Here, four recording unit regions (A1 to A4) among recordable regions of the holographic recording medium are shown. The recording unit region is referred to as the recording region simply hereinafter.

Figure 13:
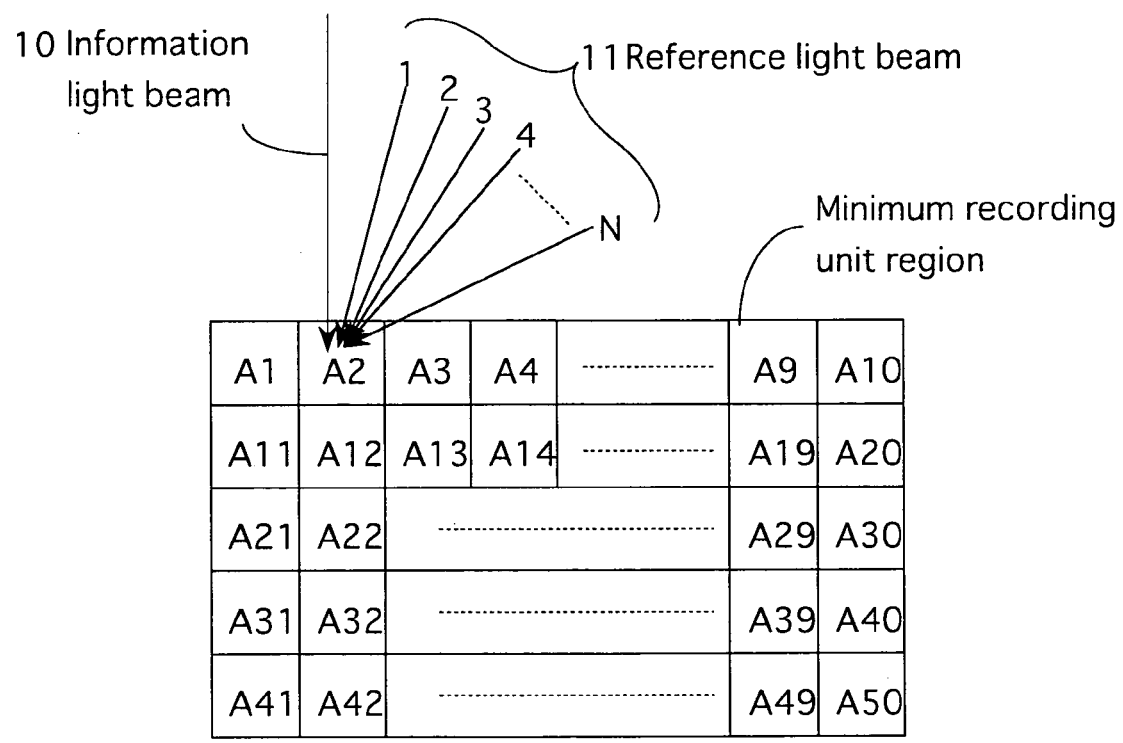
FIG. 13 is an explanatory diagram for conventional angular multiplex-recording.
Figure 14:
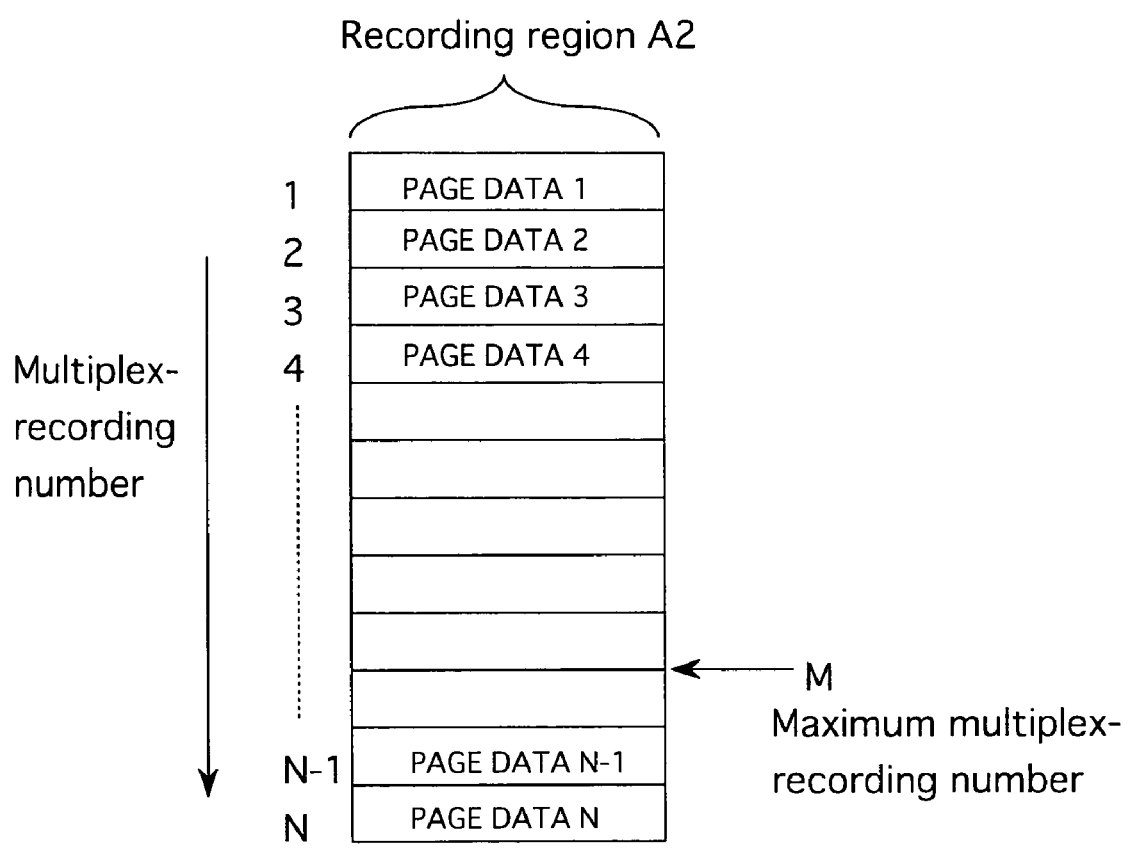
FIG. 14 is an explanatory diagram for conventional multiplex-recording.
Figure 15:
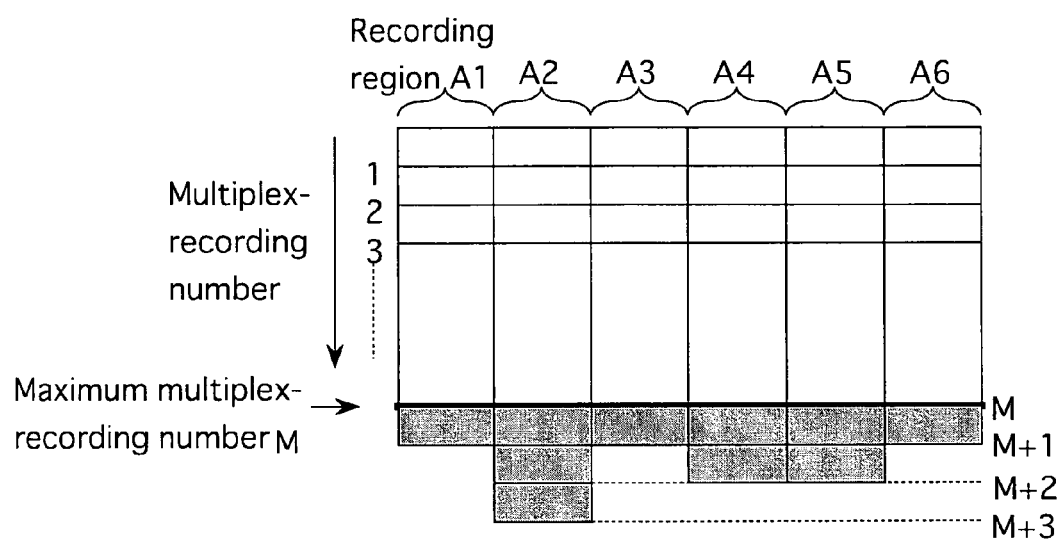
FIG. 15 is an explanatory diagram for conventional setting of the maximum multiplex-recordable number.
Figure 16:
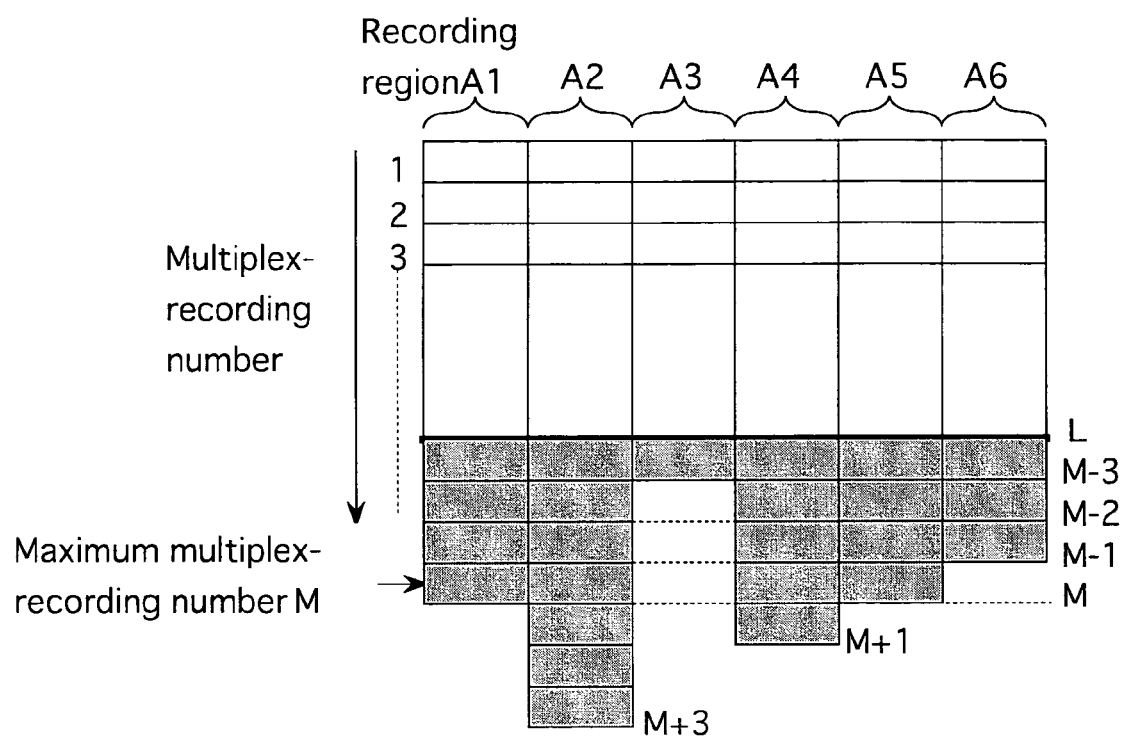
FIG. 16 is an explanatory diagram for variation in multiplicity of the conventional multiplex-recording.

Page data is recorded in the recording region by irradiating each recording region with an information light beam and a reference light beam. In case of the angular multiplex-recording, different page data are multiplex-recorded in the same region by changing the irradiation angle of the reference light beam as shown in FIG. 13.

The recording regions (A1 to A4) in FIG. 1 are physically different recording regions and the number of page data which can be recorded in the same region (multiplex-recording number) is shown in a depth direction (vertical direction in the drawing) of the recording region. Although the page data are recorded in different positions in the depth direction for explanation in FIG. 1, the plurality of page data are recorded in the same recording position actually.

According to the first embodiment of the present invention, it is assumed that the maximum multiplex-recordable number of the recording region (A1 to A4) is set to N uniformly and one recording region includes data recording regions and buffer regions for the page data. In addition, it is assumed that the number of page data which can be recorded in one data recording region (multiplex-recording number) is set to M (M<N) and the buffer regions have space in which N−M page data can be recorded.

Here, the multiplex-recording number M of the data recording regions is the number of recordings which is ensured by a manufacturer before shipment or according to a designed specification. That is, it is ensured that M page data can be surely recorded and reproduced in any recording region.

The buffer region is a preliminary region (referred to as a substitution region also) provided to ensure the multiplex-recording number M in the recording region in case that a recording error such as a parity error or recording defect of the page data occurs when the page data is recorded in the data recording region.

For example, in case that the all of the M page data can be normally multiplex-recorded in the data recording regions (A1-1 to A1-M) in the recording region A1, the buffer regions (A1-M+1 to A1-N) are not used, but when the recording error occurs at the time of recording of the page data, the buffer region is used.

Here, although the maximum multiplex-recordable number N is the number of page data which can be multiplex-recorded in the recording region actually, it is previously measured when the medium is inserted, for example by a method which will be described below. In addition, in order to ensure satisfactory recording reliability, the multiplex-recording number M of the data recording regions is set low uniformly and it is satisfied that N>M. When it is assumed that N=M+α, α corresponds to the number of page data which can be recorded in the buffer regions.

More specifically, when it is assumed that the multiplex-recording number M of the data recording regions is 100 and the maximum multiplex-recordable number N is 105, the number (α) of data which can be recorded in the buffer regions is 5 (=105−100).

According to the first embodiment, although the maximum multiplex-recordable number N may be measured for each recording region of the medium, it is preferable that only representative recording regions are measured practically.

For example, all of the recording regions of the medium is divided into P groups each having a predetermined area and one recording region in the group is selected based on a predetermined selection criterion and the P selected recording regions and their maximum multiplex-recordable numbers N may be measured.

Thus, an average value of the P measured maximum multiplex-recordable numbers is found and this average value may be set to the maximum multiplex-recordable number N of the medium.

The P selected recording regions may be the first recording region of that group or may be the recording region in the vicinity of the center. However, it is preferable that the recording regions which are not adjacent to each other like in FIG. 1 but apart from each other are selected in view of variation in recording characteristics due to difference in position.

Referring to FIG. 1, when the multiplex-recording number M is previously set for all of the regions as the number of page data which can be surely recorded and reproduced, satisfactory reliability of the recording and reproducing of the data can be ensured.

In addition, since the multiplex-recordings are performed until the multiplex-recording number M conventionally, even when there is free space corresponding to the buffer regions in which the page data can be actually recorded, the page data cannot be multiplex-recorded any more and only the number of multiplex-recordings could be less than the multiplex-recording number M due to the recording error.

According to the present invention, the buffer regions in which the page data can be recorded are provided in view of the characteristics of the recording region and since the page data which could not recorded due to the recording error can be multiplex-recorded there, the recording multiplicity M set when it was designed or the medium was inserted can be implemented.

In addition, in case that the recording error occurs beyond the multiplex-recordable numbers (N−M) of the buffer regions, the page data which could not recorded due to the recording error may be recorded in a buffer region in another recording region (adjacent recording region, for example). Thus, since the free space of the buffer regions in which the page data can be recorded substantially can be effectively used, even when the recording error occurs, the recording space which was originally designed can be ensured.

FIGS. 5, 6 and 7 are explanatory diagrams for the multiplex-recording of the page data according to one embodiment.

Referring to FIGS. 5A and 5B, it is assumed that the multiplex-recording number of the data recording regions is set to 10 (=M) and the multiplex-recording number of the buffer recording regions is set to 4 (N=10+4).

FIG. 5A shows a case in which three page data are recorded in a recording region A2. At this time, when it is assumed that a recording error occurs when the page data 3 is recorded, the page data 3 is multiplex-recorded in the same region A2 again. According to the holographic recording medium, since the page data in which the recording error occurred cannot be deleted in general, that page data is left as it is. Therefore, the page data 3 to be recorded again is recorded in the region A2 as the fourth page data (refer to FIG. 5B).

Referring to FIG. 5B, although 10 page data should be recorded originally, since the page data 3 is recorded twice, the remaining number of the page data which can be recorded is 6 in a conventional case in which 10 page data can be recorded in maximum. In this case, the maximum number of the page data which can be recorded in the data recording region is 9, so that the multiplex-recording number (M) is reduced by one and space for the recordable page data is reduced by one.

However, according to the present invention, since the buffer region is used to record the page data actually, the originally set multiplex-recording number (M=10) can be ensured (refer to FIGS. 6A and 6B).

FIGS. 6A and 6B are explanatory diagrams when page data 9 and page data 10 are multiplex-recorded.

FIG. 6A shows a state after page data 4 to page data 9 were multiplex-recorded from the state shown in FIG. 5B. Here, although 10 page data containing the page data 3 of the recording error are multiplex-recorded, only 9 page data are multiplex-recorded substantially.

FIG. 6B shows a case in which the tenth page data 10 is multiplex-recorded in the region A2. The page data 10 is recorded in the buffer region. At this time, although the multiplex-recording number in the region A2 is 11, the substantial multiplex-recording number of the page data is 10, so that the originally designed recording multiplicity (M=10) can be ensured. In other words, the recording region in which the page data can be recorded can be effectively used, so that the originally designed recording space can be implemented.

FIGS. 7A and 7B are explanatory diagrams of the multiplex-recording in a case where the multiplex-recordings are performed using the buffer regions like in FIG. 6B and the buffer region of the recording regions are used up.

FIG. 7A shows a case where recording errors occurred 5 times while the page data 1 to 9 are recorded in the region A2 and the buffer regions of the region A2 are used up. At this time, the multiplex-recording number of the page data in the region A2 is 9 and the originally set multiplex-recording number (M=10) is not implemented and the recording space is reduced substantially.

That is, although the multiplex-recording number (M=10) cannot be implemented when only the region A2 is used like in the state shown in FIG. 7A, when another recording region which has free space in the buffer regions is used, the originally set multiplex-recording number (M=10) in the region A2 can be apparently implemented.

FIG. 7B is an explanatory view for the multiplex-recording using the buffer region of the adjacent recording region A3. Here, it is assumed that there is a free space in the buffer regions of the recording region A3. When the tenth page data 10 is required to be recorded in the recording region A2, since there is no space in the data recording regions nor in the buffer regions in the region A2, the page data 10 is recorded in the region A3 in which there is a free space in the buffer regions.

In addition, information indicating that the page data 10 which was to be recorded in the region A2 is multiplex-recorded in the buffer region of the region A3 is to be recorded in a specific management region. Thus, the originally set multiplex-recording number (M=10) for the region A can be implemented.

Thus, by effectively using the buffer region of another recording region, the originally designed recording space for a certain recording region can be ensured.

Second Embodiment

Figure 2:
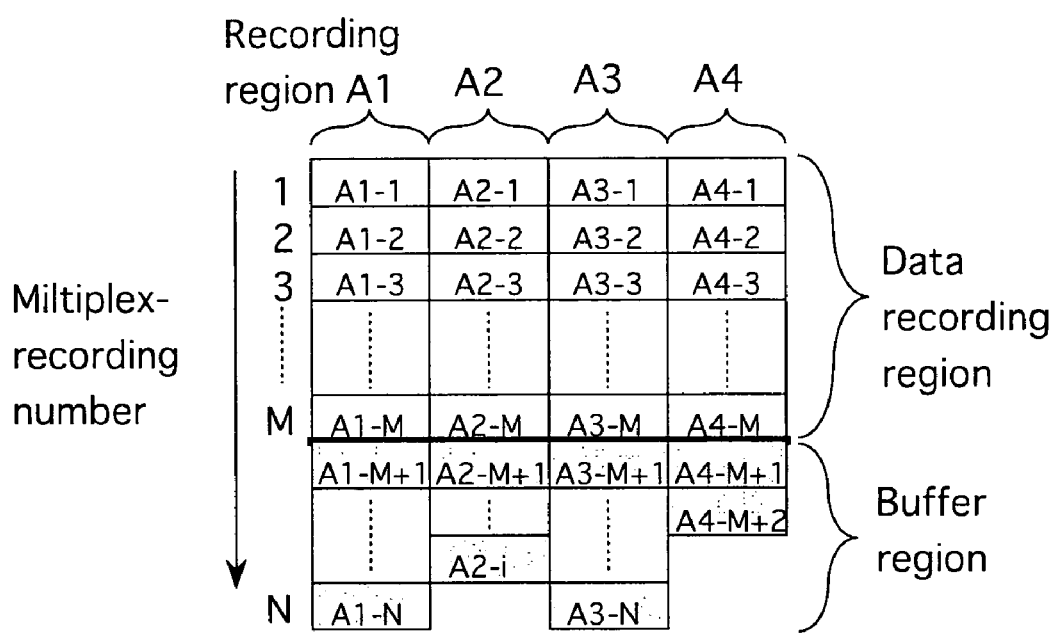
FIG. 2 is an explanatory diagram for multiplex-recording according to a second embodiment of the present invention.

FIG. 2 is an explanatory diagram for multiplex-recording according to a second embodiment of the present invention.

Referring to FIG. 2, although the multiplex-recording number of each of the recording regions (A1 to A4) set at the time of the shipment is all M, the multiplex-recording number of the buffer regions is different. Thus, when the multiplex-recording number of the buffer regions is differentiated, the space of the recording region which can be multiplex-recorded actually can be more effectively used.

In the holographic recording medium as described above, since the recording and reproducing characteristics are different locally, there are recording regions in which the recording and reproducing can be performed more than the multiplex-recording number, and recording regions in which the originally designed multiplex-recording number M can be ensured satisfactorily but its multiplicity is not satisfactorily provided due to a physical defect. That is, the number of page data which can be multiplex-recorded actually differs from recording region to region. Thus, the maximum multiplex-recordable number N is measured in each recording region and the multiplex-recording number to be used as the buffer regions is found in each recording region. Thus, the buffer regions corresponding to the characteristics of each recording region can be ensured.

Referring to FIG. 2, buffer regions are from A1−M+1 to A1−N in the recording region A1, and buffer regions are from A2−M+1 to A2−i in the recording region A2 (N>i), and buffer regions are from A4−M+1 and A4−M+2 in the recording region A4. In other words, although the multiplex-recording number M of the page data is all the same in the recording regions, the maximum multiplex-recordable number is different every recording region.

In this case, since the originally set multiplex-recording number M can be ensured in all regions and the buffer regions are provided according to the characteristics of each recording region, even when a recording error occurs, the originally designed multiplex-recording number M of the page data can be implemented within the multiplex-recording number of the buffer regions.

In addition, as shown in FIG. 7, in case that the buffer region of the adjacent recording region is used, even when the buffer regions in a certain region are used up, the originally set multiplex-recording number can be implemented.

In addition, in case that the recording region in which more multiplex-recording number can be set exists, more effective multiplex-recording can be implemented in such recording region as compared with the case the multiplex-recording number of the buffer regions is uniformly set like in FIG. 1.

Although the description has been made of the case where the maximum multiplex-recordable number N is measured in each recording region in the second embodiment, in case of a write-once medium in which only one recording is performed, since it is impossible to measure all recording regions, the maximum multiplex-recordable number N is found only in some recording regions selected based on a certain selection criterion.

For example, the all recording regions is divided into a plurality (R) of groups having a certain area, and the maximum multiplex-recordable number N is measured in only one representative recording region belonging to the group. Then, the measured maximum multiplex-recordable number N is applied to all of the recording regions belonging to the group.

In other words, the same maximum multiplex-recordable number N is set to all of the recording regions belonging to the same group. However, when the group is different, the maximum multiplex-recordable number N could be different.

A method of dividing the recording regions into the groups may be determined in view of the local characteristic variation of the medium. In addition, the selection criterion of the recording regions in the group is not particularly limited, and the first recording region may be selected, for example.

In addition, the multiplex-recording number M of the page data is to be set to a value smaller than the smallest maximum multiplex-recordable number among the measured R maximum multiplex-recordable numbers. The multiplex-recording number M is uniformly set for all of the recording regions on the medium.

Third Embodiment

Figure 3:
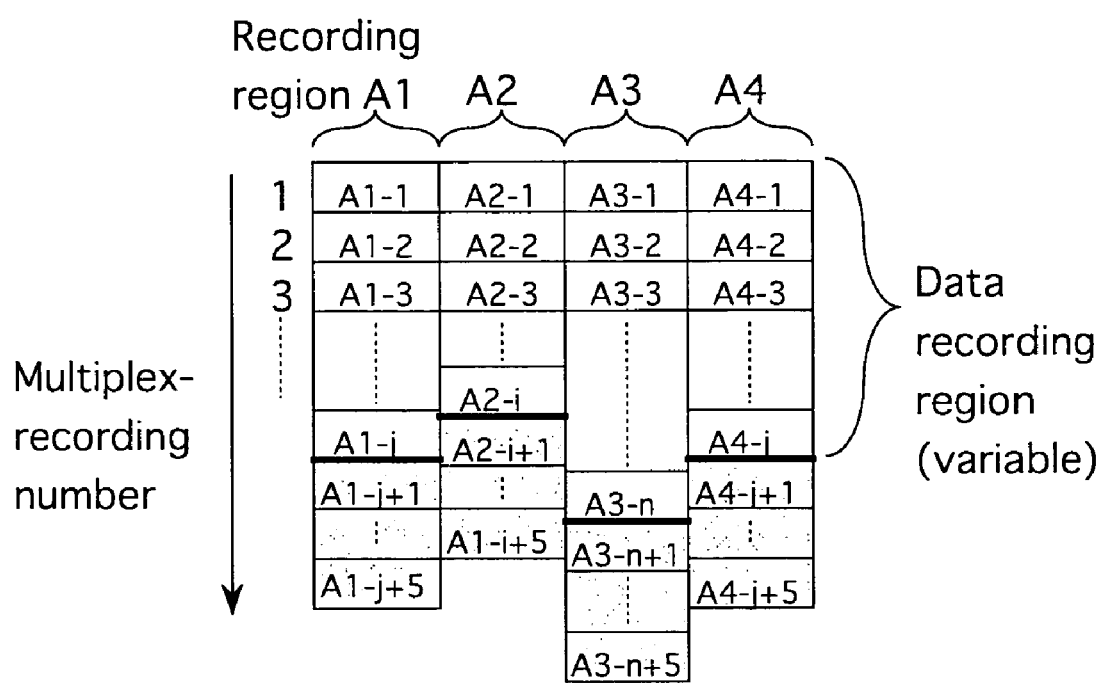
FIG. 3 is an explanatory diagram for multiplex-recording according to a third embodiment of the present invention.

FIG. 3 is an explanatory diagram for multiplex-recording according to a third embodiment of the present invention.

Here, the multiplex-recording number of the data recording region is also variable.

For example, the multiplex-recording number of the data recording regions of a region A1 is "j" and the multiplex-recording number of the data recording regions of a region A2 is "i" (≠j).

In addition, the multiplex-recording number of the buffer regions is uniformly set to 5 in FIG. 3. However, the multiplex-recording number of the buffer regions may be different every recording region according to the characteristics of the each of the recording regions (A1 to A4).

Thus, the original multiplex-recording number j (j>M) in the recording region which has very excellent characteristics locally can be set more, so that the recording space for the page data in the recording region can be increased as compared with the case the multiplex-recording number is uniformly set to M.

In the third embodiment also, the maximum multiplex-recordable number N is not measured in each recording region, but one recording region is selected from the R groups divided by a certain selection criterion and the maximum multiplex-recordable number N in each of the selected R recording regions may be measured.

The R selected maximum multiplex-recordable number N is applied to all of the recording regions belonging to the respective groups. In addition, the multiplex-recording number M of the page data applied to all of the recording regions in the group is set using the maximum multiplex-recordable number of the group.

In other words, when the maximum multiplex-recordable number N differs from group to group, the multiplex-recording number M of the page data is set to a different value every group. Therefore, the multiplex-recording number of the buffer regions is set to N−M in each group and it may differ from group to group.

Fourth Embodiment

Figure 4:
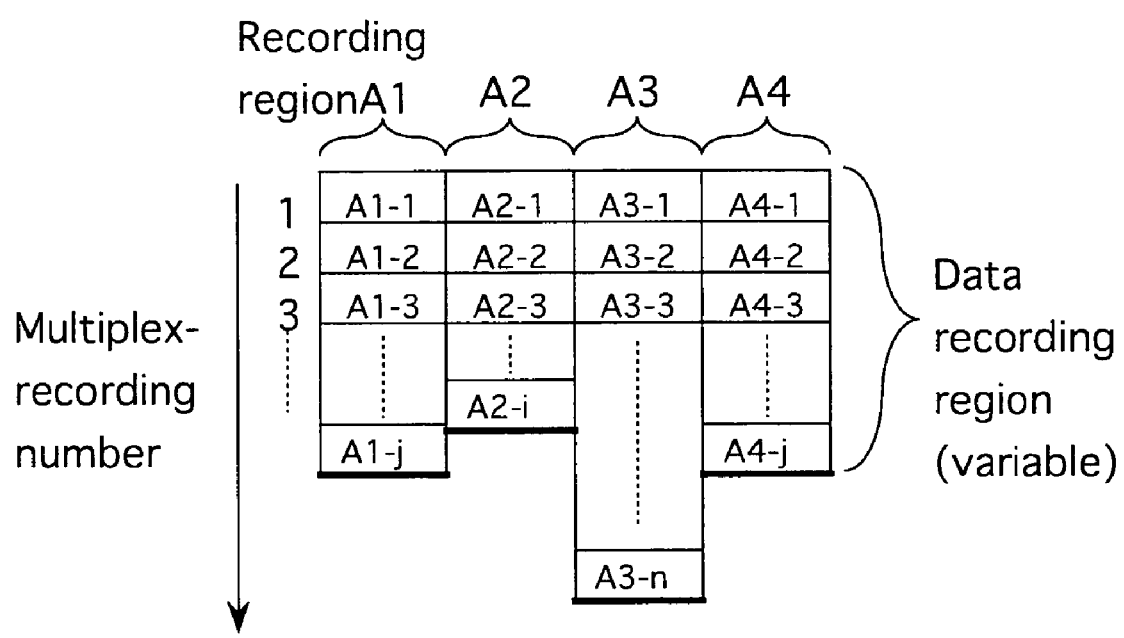
FIG. 4 is an explanatory diagram for multiplex-recording according to a fourth embodiment of the present invention.

FIG. 4 is an explanatory diagram for multiplex-recording according to a fourth embodiment of the present invention. In this example, the multiplex-recording number M of the data recording regions is variable and a buffer region is not provided. In other words, the multiplex-recording number is measured in each recording region so as to ensure satisfactory reliability of the recording and reproducing and the multiplex-recording number of the page data is set in each recording region.

Thus, as compared with the case the multiplex-recording number of the data recording regions is uniformly determined, since the multiplex-recording number M of a region having the locally high characteristics can be set more, the recording capacity of the page data can be increased substantially.

Measurement of Multiplex Recording Number of Holographic Recording Medium

Here, a description will be made of measurement of the multiplex-recording number taken for the holographic recording medium before the user data is recorded or reproduced actually.

Figure 8:
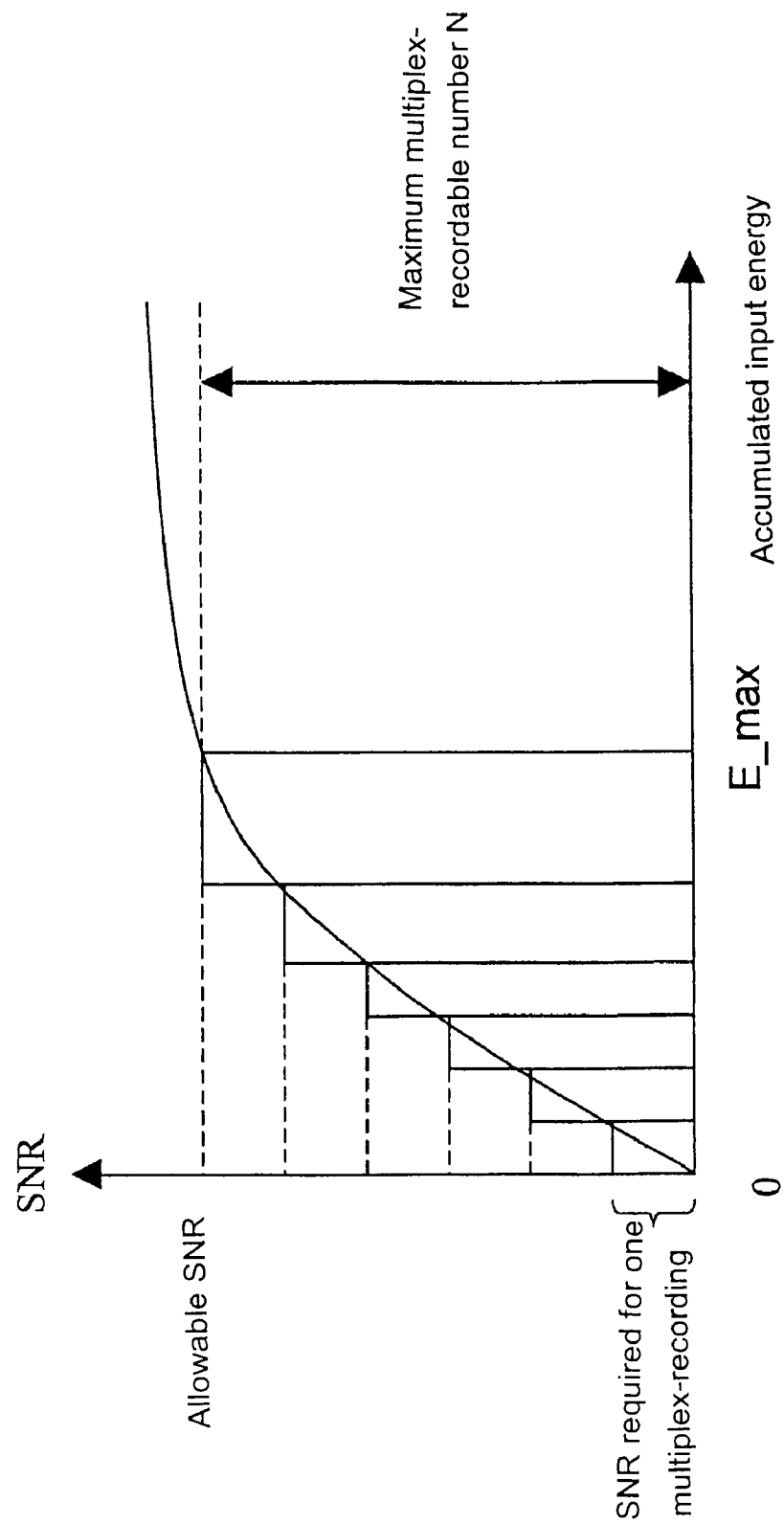
FIG. 8 is a graph showing a relation between recording characteristics and the multiplex-recording number of a recording region according to the present invention.

FIG. 8 is a graph showing a relation between accumulated input energy of irradiation light beam inputted to the holographic recording medium and the SNR. Here, the number of page data which can be recorded in one recording region of the holographic recording medium (maximum multiplex-recordable number) is set to N.

In addition, when it is assumed that the energy of the irradiation light beam required to record one page data in its recording region is constant, the SNR (required for one multiplex-recording) corresponding to that energy is also constant. When N different page data are recorded in the same recording region, the constant energy of the irradiation light beam is applied to that recording region N times.

A horizontal axis in FIG. 8 shows the accumulated input energy applied to a certain recording region and a vertical axis therein shows the total of the SNR added each time of multiplex-recording.

The accumulated input energy is designated by an energy density applied to the recording region×irradiation time. The energy density is light energy required for one multiplex-recording (required for recording one page data).

For example, FIG. 8 shows a case in which the maximum multiplex-recordable number N=6. In other words, in case that 6 page data are multiplex-recorded in the recording region, when the accumulated input energy is E_max, the total of the SNR reaches the allowable SNR in that region.

In addition, in case that the seventh page data is recorded in a state the 6 page data have been already recorded in the same recording region, since the total SNR exceeds the allowable SNR, it means that the seventh page data cannot be normally recorded. As another case, when the seventh page data is recorded, the normally recorded page data could be destroyed.

When the two parameters (the SNR and the energy) having the above relation are used, the maximum multiplex-recordable number N can be found in each recording region. An embodiment of a method of finding the N will be described hereinafter.

Figure 9:
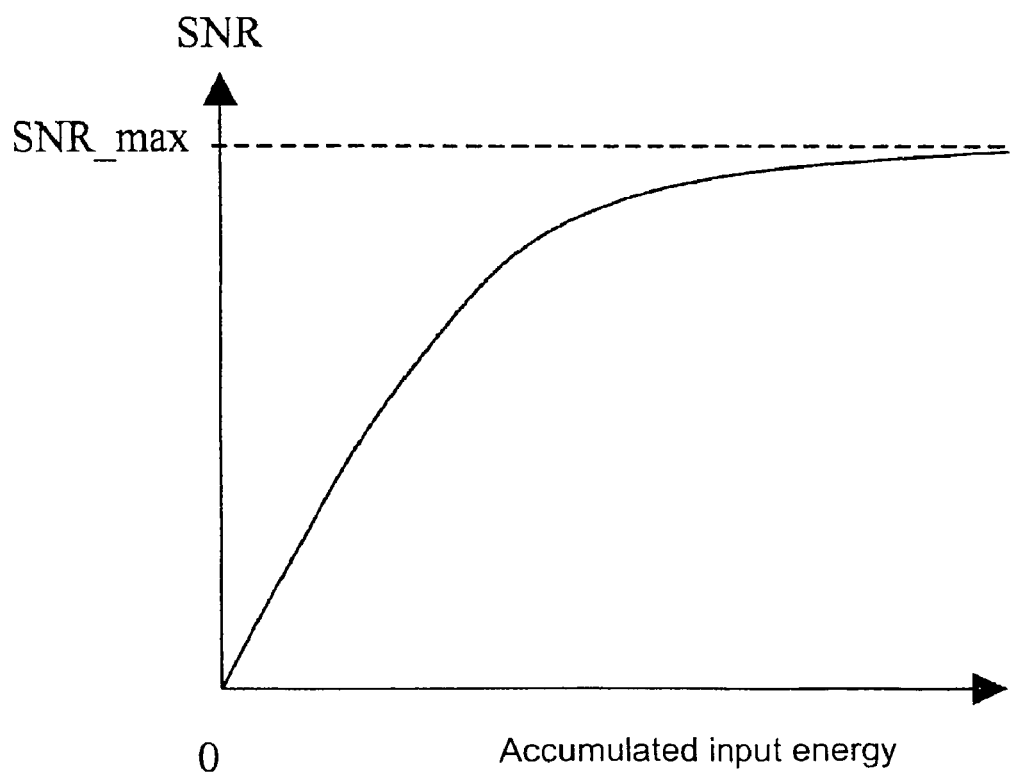
FIG. 9 is a graph showing a relation between accumulated input energy and a SNR according to the present invention.

First, the graph showing a relation between the accumulated input energy and the SNR like in FIG. 9 is found when performance of a holographic recording medium is evaluated at its designing stage of the medium.

The accumulated input energy can be found by correcting an energy density of a laser light source to be used when its shipment and adjusting a time interval of irradiation to the medium.

The SNR can be found by recording a specific pattern for evaluating performance and detecting its reproduced image on a light receiving element (CCD, for example) and using intensity distribution of the image and the following definitional equation.

$$SNR = (\mu(ON) - \mu(OFF))/\sqrt{(\sigma(ON)^2 + \sigma(OFF)^2)}$$

Here, $\mu(ON)$ designates an average value of intensity of pixel in a bright state on the CCD, $\mu(OFF)$ designates an average value of intensity of the pixel in a dark state, $\sigma(ON)$ designates a standard deviation of the intensity distribution of the pixel in the bright state, and $\sigma(OFF)$ is a standard deviation of the intensity distribution of the pixel in the dark state.

The graph shown in FIG. 9 can be found by processing the above measured result on firmware in the measuring device, for example.

Next, the allowable SNR of the medium (referred to as SNR_max) is found from the graph shown in FIG. 9. In the graph in FIG. 9, the allowable SNR (SNR_max) can be found from an upper limit value of an integral multiple of the SNR (required for one multiplex-recording and referred to as SNR_ave hereinafter) when one page data is recorded.

Here, it is assumed that the SNR_ave is predetermined at the time of designing.

Figure 10:
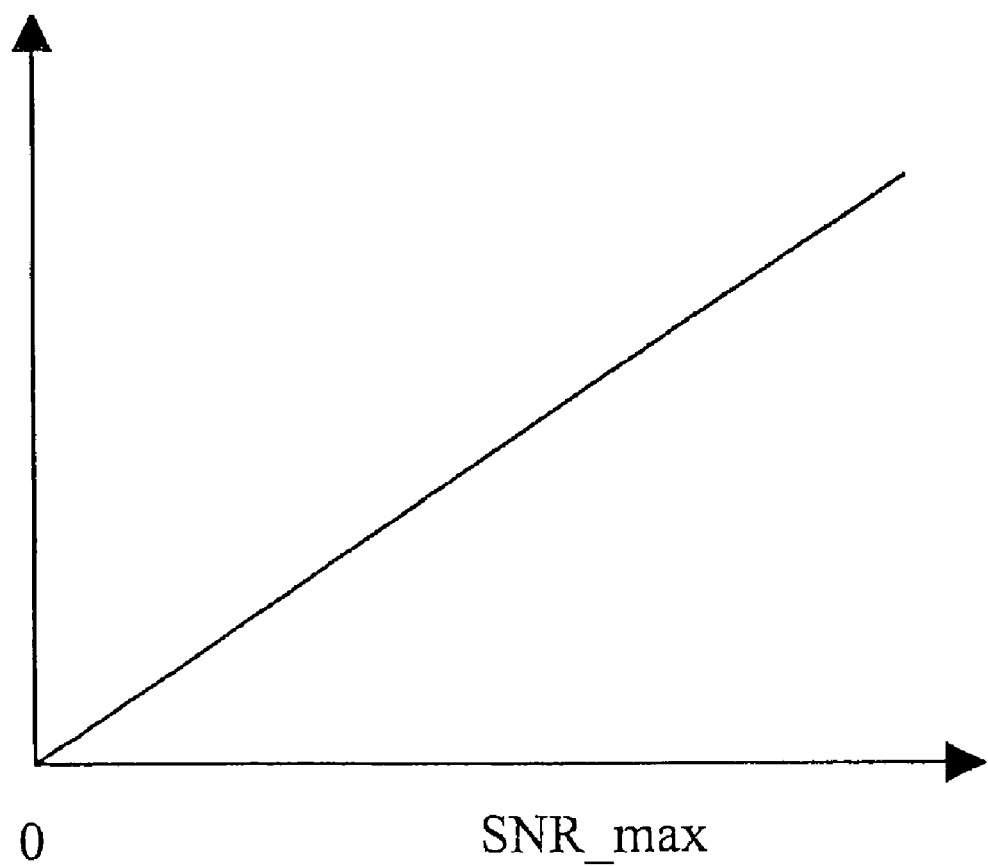
FIG. 10 is a graph showing a correlation between SNR_max and maximum multiplex-recordable number N according to the present invention.

Then, correlation data between the SNR_max and the maximum multiplex-recordable number N is found on the firmware in the measuring device. For example, the correlation data is a graph shown in FIG. 10. In other words, as the SNR_max is increased, the number of page data which can be recorded in the same region of the medium (maximum multiplex-recordable number N) is increased.

In addition, the maximum multiplex-recordable number N can be designated by the following equation using the allowable SNR (SNR_max) and the SNR required for one multiplex-recording (SNR_ave).

$$N = \text{SNR\_max}/\text{SNR\_ave}$$

Thus, the maximum multiplex-recordable number N of a certain holographic recording medium at the time of designing is found.

The value N found by the above corresponds to the maximum multiplex-recordable number N having the number of the data recording regions and the number of the buffer regions according to the example shown in FIG. 1, for example. In addition, the multiplex-recording number M (M<N) of the data recording region in FIG. 1 is determined based on the value N in view of a degree of reliability of the recording and reproducing to be ensured, a recording space, another designed specification parameter and the like.

In addition, the above measuring process may be performed not only when the performance is evaluated at the time of designing but also when a sample medium is inspected in the manufacturing stage of the medium.

In addition, it is recognized that the allowable SNR (SNR_max) has a strong relation with an initial inclination angle of the graph shown in FIG. 9. In other words, by measuring the initial inclination angle of the graph in FIG. 9, the value of the SNR_max can be specified.

Here, an initial inclination angle θ means a rising angle at a recording start part and this angle can be specified by an increased amount of the SNR to the energy input amount. It is considered that the inclination angle θ is varied because a local defect of the medium or local inertness at the time of manufacturing and the like is generated.

According to the variation of the graph in FIG. 9, it can be said that when the angle θ of the initial inclination of a certain recording region is relatively great, the SNR_max is also great and the number of page data which can be multiplex-recorded (maximum multiplex-recordable number) is also great.

Meanwhile, when there is a defect in a certain recording region on the medium, the angle θ of the initial inclination of that region is relatively small and at this time, it can be said that the SNR_max is also becomes small and the number of the page data which can be multiplex-recorded (maximum multiplex-recordable number) becomes also small.

Strictly speaking, although it is necessary to find the graph in FIG. 9 and measure the SNR_max in each recording region, the SNR_max cannot be measured for all regions in the case of the write-once medium which cannot be rewritten. Thus, the reality is, the SNR_max and the maximum multiplex-recordable number N are found for one representative recording region among the recording regions of the group of the medium and it is assumed that the other recording regions in the group have the same maximum multiplex-recordable number because it is not likely that the adjacent recording regions have largely different maximum multiplex-recordable number N.

In addition, as described above, since the value of SNR_max and the initial inclination of the graph has strong correlation, instead of finding the SNR_max of one recording region, the angle θ of the initial inclination of the graph in FIG. 9 may be measured by irradiating the medium with the light beam having the SNR_ave required for one multiplex-recording to specify the SNR_max. For example, a recording light beam having energy EX1 determined for evaluation is applied and its SNR1 at that time is found by the method described above. An angle θ1 is found from the above result and the SNR_max is calculated using a difference between the angle θ1 and an angle θ2 of a standard recording medium previously recorded in the firmware. Thus, the SNR_max can be specified without finding the graph in FIG. 9 actually.

Next, a concrete example to measure the maximum multiplex-recordable number N in one recording region on the medium will be described.

Here, it is assumed that the maximum multiplex-recordable number (referred to as average multiplicity) of the holographic recording medium determined as designed is N1. In other words, it is assumed that the average of the maximum multiplex-recordable number including the number of the buffer regions of the holographic recording medium is N1 also in an evaluation test at the time of designing. It is also assumed that the allowable SNR found when this evaluation test is performed is SNR_max1.

When it is assumed that the SNR required for one multiplex-recording of the medium is SNR_ave, the following equation is established.

$$N1 = \text{SNR\_max1}/\text{SNR\_ave}$$

Figure 11:
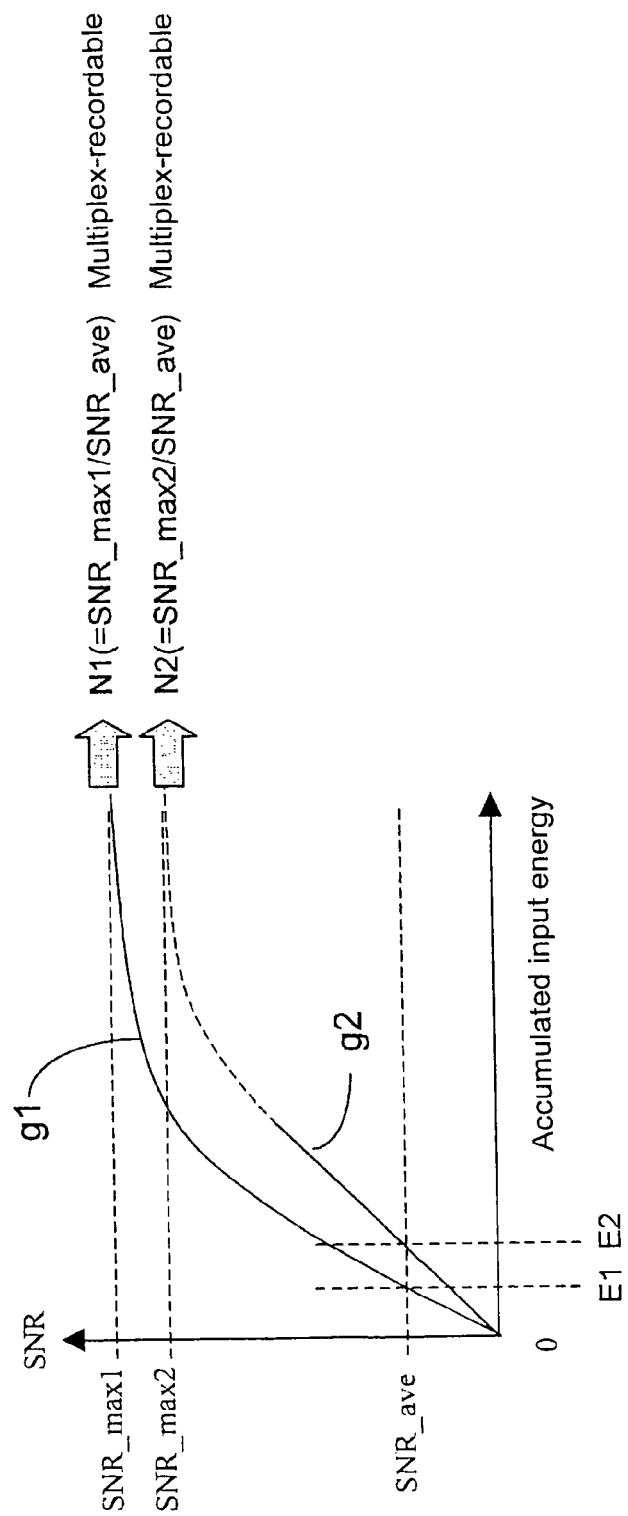
FIG. 11 is an explanatory diagram for a relation between the multiplex-recordable number and the SNR according to the present invention.

FIG. 11 is a graph showing a relation between accumulated input energy and the SNR in this concrete example.

Referring to FIG. 11, a graph g1 is a relation graph found in the evaluation test at the time of designing. In the graph g1, it is assumed that input energy to be applied to provide the SNR (SNR_ave) required for one multiplex-recording is E1 according to its design.

First, a light beam having the input energy E1 to provide the SNR (SNR_ave) required for one multiplex-recording is applied to a recording region A1 to be measured, at a timing such as immediately after loading of a medium. This writing of information with the light is called test writing. Since this light irradiation is the test writing, an incident angle of the reference light beam or information light beam is not specified and only the total energy of these light beams has to be E1.

In case that the recording region A1 to be measured has characteristics as designed, when the region A1 is irradiated with the light beam having the input energy E1, the SNR of the region A1 shows the same value as SNR_ave and the maximum multiplex-recordable number N of the recording region A1 is N1 as designed.

However, in case that the recording region A1 has a certain defect and the number of page data which can be multiplied is reduced, its characteristic graph becomes a graph g2 shown in FIG. 11.

In this case, even when the input energy E1 required for one multiplex-recording is applied, the provided SNR becomes smaller than the SNR_ave due to the defect. In other words, even when the light beam having the energy E1 as designed is applied, one page data cannot be correctly recorded. Therefore, it is necessary to apply a light beam having energy E2 which can provide the same SNR as the SNR_ave in order to record the page data correctly.

The energy E2 required to provide the SNR_ave can be found by comparing the SNR which was provided by the energy E1 with the SNR_ave recorded in the firmware.

Although the whole graph g2 in FIG. 11 cannot be found, since the energy E2 corresponding to the SNR_ave can be found, the angle θ of the initial inclination of the graph g2 shown in FIG. 11 can be found by calculation using a difference from a measured result of the standard medium recorded in the firmware.

As described above, when the angle θ of the initial inclination is found, variation tendency of the graph g2 shown in FIG. 11 can be estimated from the angle θ and the allowable SNR (referred to as SNR_max2) in the recording region A1 can be found.

In this example, the SNR_max2 is smaller than the SNR_max1. Thus, the maximum multiplex-recordable number N2 in the recording region A1 can be calculated by the following equation.

$$N2 = SNR\_max2/SNR\_ave$$

In this example in FIG. 11, since N2<N1, the multiplex-recording number of the buffer regions in the recording region A1 is smaller than the originally designed (N1−M) and becomes (N2−M) where M<N2<N1.

In this example, when the originally designed (N1−M) buffer regions in the recording region A1 are used without finding the actual maximum multiplex-recordable number N2 in the recording region A1, the buffer regions could be used beyond the actual maximum multiplex-recordable number, so that the recording error could occur.

However, when the above measurement is performed and the actual maximum multiplex-recordable number N2 in the recording region A1 is found, only (N2−M) buffer regions are used and the buffer regions are not used beyond the number N2. As a result, the recording error is prevented from occurring and the actual recording space of the recording region A1 can be effectively used.

Meanwhile, when the graph shown in FIG. 11 is found and the maximum multiplex-recordable number N3 in a recording region A3 is found, if it is determined that N3>N1, it means that in the recording region A1 the multiplex-recording can be performed more than the maximum multiplex-recordable number N1 as originally designed.

For example, in the case of the embodiment shown in FIG. 2, more buffer regions can be used like the region A3, so that the recordable region can be more effectively used. In addition, in the case of the embodiment shown in FIG. 3, like the region A3, the multiplex-recording number of the data recording region can be increased more than the other regions, so that the number of page data which can be recorded in the recording region A3 can be increased. In other words, the recording capacity of the page data can be increased more than that originally designed.

Meanwhile, since the energy E2 could differ from recording region to recording region among the above measuring procedures, it is necessary to measure the energy E2 every recording region or every representative recording region in one group. However, the processing (for initial inclination, SNR_max2 and N2) after the energy E2 was found may be performed by the same calculations every holographic recording medium, parameters or calculation expressions for each medium may be stored in a memory of the recording and reproducing apparatus or in the medium itself.

The parameters to be stored includes, for example, the SNR provided by the energy E1, a temperature at the time of measurement and the like.

In addition, the measured maximum multiplex-recordable number N or the set multiplex-recording number M are also stored in the memory (RAM, flash memory, hard disk and the like) of the recording and reproducing apparatus.

For example, according to a portable holographic recording medium, information such as its manufacturer, revision, manufacturing number and the like is previously recorded in the medium itself in general. Thus, such information may be read out just after the medium is inserted into the recording and reproducing apparatus to search the parameter and the like stored in the device corresponding to the readout information and find the SNR_max2 and the N2 using the searched result after the energy E2 of the medium is measured.

The above measurement of the maximum multiplex-recordable number can be applied to a write-once medium in which only one recording can be performed or a rewritable medium in which recording can be performed many times.

However, in the case of the rewritable medium, since the test data can be deleted even after the test writing is performed, the actual energy E2 and maximum multiplex-recordable number N2 may be found by applying the light beam having the unit energy E1 the multiplex-recording number times to perform the multiplex-recordings the originally designed multiplex-recording number times and finding the total SNR.

In addition, in the case of the rewritable medium, the E2 and the N2 may be measured for all recording regions other than the representative recording regions. In this case, although it takes a lot of time for measurement, the more correct maximum multiplex-recordable number can be found, so that its recordable capacity can be more effectively used.

In addition, when measurement in the representative recording region is taken, since a unit region which can be accessed is set every logic address in the medium and a plurality of physical recording regions are contained in the unit region in general, only the first recording region may be measured among the plurality of recording regions.

In addition, the measurement may be taken for recording regions apart from at a distance in which the characteristic variation could be conspicuous in view of a designing specification or a manufacturing experience.

In addition, although the above measurement may be taken at any timing, it is preferably taken just after the medium is inserted into the apparatus, while an idling state in which the recording or reproducing operation is not performed, before the recording operation is performed on the medium, or just after returned from a standby state.

According to the present invention, since the multiplex-recording number of the page data and the multiplex-recording number of the buffer regions are set for one recording unit region of the holographic recording medium so as to correspond to the recording and reproducing characteristics of each recording unit region or each group to which the recording unit region belongs, the originally designed multiplex-recording number of the page data can be implemented by using the buffer region, and the recording space (multiplicity) of the recording unit region can be effectively used while the reliability of the original recording and reproducing characteristics can be sufficiently ensured.

Especially, when the multiplex-recording number of the page data is set so as to differ from group to group to which the recording unit region belongs, the recording space can be more effectively used and the recording space of the page data can be substantially increased.

What is claimed is:

1. A recording and reproducing apparatus comprising:

a recording control section for recording plural pages data by irradiating a holographic recording medium with a reference light beam and an information light beam, the medium including a plurality of recording unit regions and being capable of having plural pages data multiplex-recorded in each of the recording unit regions;

a reproducing control section for selectively reproducing specific page data among the plural pages data multiplex-recorded in one of the plurality of recording unit regions, by irradiating the medium with the reference light beam;

a measuring section for causing the recording control section to record specific page data in a recording unit region A, which is one of the plurality of recording unit regions, to measure a maximum multiplex-recordable number N of the recording unit region A;

a multiplicity setting section for setting (i) a multiplex-recording number M (M<N) of page data to be recorded in the recording unit region A and (ii) a multiplex-recording number (N−M) of a buffer region of the recording unit region A, by using the maximum multiplex-recordable number N; and a storage section for storing the maximum multiplex-recordable number N and the multiplex-recording number M, wherein when page data B is to be recorded in the recording unit region A beyond the multiplex-recording number M, the recording control section multiplex-records page data B in the buffer region of the recording unit region A within the range of the maximum multiplex-recordable number N.

2. The recording and reproducing apparatus according to claim 1, wherein the measuring section selects P (P>1) recording unit regions among the plurality of recording unit regions based on a predetermined selection criterion, measures maximum multiplex-recordable numbers N of the selected P recording unit regions respectively, and sets an average value of the measured P maximum multiplex-recordable numbers to a maximum multiplex-recordable number N of the medium, and wherein the multiplicity setting section sets a multiplex-recording number M, which is to be applied to all of the recording unit regions of the medium uniformly, by using the set maximum multiplex-recordable number N.

3. The recording and reproducing apparatus according to claim 1, wherein the measuring section divides the plurality of recording unit regions into R (R>1) groups, selects one recording unit region from each group according to a predetermined selection criterion, measures maximum multiplex-recordable numbers (N1, N2, . . . NR) of, respectively, the selected R respective recording unit regions (A1, A2, . . . AR), and sets the measured maximum multiplex-recordable numbers (N1, N2, . . . NR) respectively to maximum multiplex-recordable numbers N of, respectively, the groups to which the recording unit regions (A1, A2, . . . AR) belong, and wherein the multiplicity setting section sets the multiplex-recording number M of the page data, which is to be applied to all of the recording unit regions of the medium uniformly, to a value smaller than the smallest maximum multiplex-recordable number of all the measured R maximum multiplex-recordable numbers (N1, N2, . . . NR), the multiplex-recording number of the buffer regions of one group differing from that of the buffer regions of another group.

4. The recording and reproducing apparatus according to claim 1, wherein the measuring section divides the plurality of recording unit regions into R (R>1) groups, selects one recording unit region from each group according to a predetermined selection criterion, measures maximum multiplex-recordable numbers (N1, N2, . . . NR) of, respectively, of the selected R recording unit regions (A1, A2, . . . AR), and sets the measured maximum multiplex-recordable numbers (N1, N2, . . . NR) respectively to maximum multiplex-recordable numbers N of, respectively, the groups to which the recording unit regions (A1, A2, . . . AR) belong, and wherein the multiplicity setting section sets multiplex-recording numbers (M1, M2, . . . MR) of page of data, which are to be respectively applied to all of the recording unit regions of each group, by respectively using the maximum multiplex-recordable numbers (N1, N2, . . . NR) of, respectively, the groups, sets a difference between the maximum multiplex-recordable numbers (N1, N2, . . . NR) and the multiplex-recording numbers (M1, M2, . . . MR) respectively to the multiplex-recording numbers (N1−M1, N2−M2, . . . NR−MR) of buffer regions of the recording unit regions in the groups, the multiplex-recording number of page data of one group differing from that of page data of another group, the multiplex-recording number of the buffer regions of one group differing from that of the buffer regions of another group.

5. The recording and reproducing apparatus according to claim 1, wherein when page data C to be recorded in the recording unit region A cannot be recorded, the recording control section multiplex-records the page data C in the same recording unit region A again, and records different page data the number of pages of which is equal to the multiplex-recording number M of the recording unit region A in the recording unit region A, within the range of the maximum multiplex-recordable number N.

6. The recording and reproducing apparatus according to claim 1, wherein when the recording control section records page data, the number of pages of which is equal to the maximum multiplex-recordable number N, in a recording unit region A1, which is one of the plurality of recording unit regions, and then the recording control section receives an instruction to record page data D in the region A1, the recording control section multiplex-records the page data D in an unused buffer region of another recording unit region A2.

* * * * *